3,424,823
COMPOSITION OF VINYL CHLORIDE POLYMERS AND COPOLYMERS OF ALKENYL AROMATIC HYDROCARBONS AND ACRYLONITRILE OR METHACRYLONITRILE
Richard H. Hall, Midland, and Junior J. Lamson, Bay City, and Andrew J. Sikkema and Carleton W. Roberts, Midland, Mich., assignors to The Dow Chemical Company, Midland, Mich., a corporation of Delaware
No Drawing. Continuation-in-part of application Ser. No. 313,738, Oct. 4, 1963. This application July 31, 1967, Ser. No. 657,072
U.S. Cl. 260—898         4 Claims
Int. Cl. C08f 29/24, 31/04

ABSTRACT OF THE DISCLOSURE

Compositions of matter comprising fusion blends of from 30 to 55 weight percent of a vinyl chloride polymer and from 70 to 45 weight percent of a resinous copolymer of at least one tertiary-alkyl ring substituted alkenyl aromatic hydrocarbon and methacrylonitrile or acrylonitrile.

---

This application is a continuation-in-part of Ser. No. 313,738, filed Oct. 4, 1963, now abandoned.

This invention relates to new, rigid, thermoplastic compositions comprising vinyl chloride polymers intimately incorporated with copolymers of acrylonitrile and tertiary alkyl alkenyl aromatic hydrocarbons, which compositions are readily processable, and are tough, flame resistant, transparent materials having good heat distortion properties.

For many purposes, there is an advantage to prepare rigid fabricated products containing significant amounts of vinyl halide polymers. Among other attributes of such polymers, they are especially well-suited where nonburnable or self-extinguishing requirements are called for. However, due to the sensitive nature of vinyl halide polymers to heat, serious problems have been encountered in fabricating articles or products from such compositions.

One method employed to overcome the attendant problems in fabricating polymeric compositions containing significant amounts of vinyl halide polymers is the addition of plasticizers in quantities of about 25 to 100 parts of the vinyl halide constituent of the polymeric composition. However, articles prepared from such highly plasticized polymer compositions are generally soft and flexible and unsuited for use in manufacturing hard, tough, substantially rigid articles. Moreover, the heat distortion temperatures of these materials are generally greatly reduced by the addition of such plasticizers.

Readily processable, plasticizer free, thermoplastic rigid vinyl halide compositions are known. In this regard, the U.S. Patent No. 2,646,417, issued Feb. 20, 1951, describes certain compositions comprising vinyl halide polymers with interpolymers of acrylonitrile and styrene or certain substituted styrenes. Such compositions, although readily processable, are generally translucent to opaque plastic masses which are characterized by heat distortion properties which are insufficient for most present day requirements.

It is also known that the addition of certain mutualizing agents (compounds which have an action of rendering polymers compatible with, or soluble in, one another) to resinous compositions, comprising predominant amounts of polyvinyl chloride intimately incorporated with correspondingly lesser amounts of a thermoplastic copolymer of an alkenyl aromatic hydrocarbon and acrylonitrile, will provide substantially transparent compositions. Examples of such compositions are those as disclosed in the U.S. Patent No. 3,043,795, issued July 10, 1962. Such prior known compositions, however, are also generally characterized by heat distortion properties of lesser magnitude than desired for the fabrication of rigid thermoplastic compositions.

Accordingly, it is an object of the present invention to provide easily processable, transparent, rigid, tough, flame resistant, thermoplastic compositions comprising vinyl halide polymers intimately incorporated with certain copolymers of acrylonitrile and tertiary alkyl alkenyl aromatic hydrocarbons.

According to the invention transparent, rigid, flame-resistant, thermoplastic resinous compositions, having good heat distortion properties, are prepared by forming a composition comprising an intimate mixture of: (1) between about 30 and 55 weight percent of a vinyl chloride polymer containing at least about 80 weight percent of polymerized vinyl chloride in the polymer molecule, as hereinafter defined, and (2) complementarily, between about 70 and 45 weight percent of a coplymer of (a) between about 15 and 35 weight percent of acrylonitrile or methacrylonitrile, and (b) complementarily, between about 85 and 65 weight percent of at least one alkenyl aromatic hydrocarbon having the formula

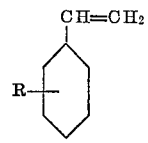

wherein R is a tertiary alkyl radical having from 4 to 8 carbon atoms, or a mixture of at least 15 weight percent of at least one such tertiary alkyl alkenyl aromatic hydrocarbon and up to 85 weight percent of at least one alkenyl aromatic hydrocarbon having the general formula

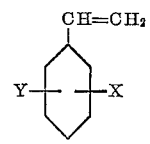

wherein X and Y are independently selected from the group consisting of hydrogen, halogen and alkyl having from 1 to 3 carbon atoms.

The compositions possess excellent mechanical properties such as tensile strength, elongation, flexural strength, and rigidity and can readily be processed by usual compression or injection molding operations or by extrusion methods to produce transparent articles useful for a variety of purposes in the home and industry.

In a further embodiment of the invention, rigid, thermoplastic compositions having the highly desirable properties as described herein, and additionally, being essentially transparent, are prepared by forming a composition comprising an intimate mixture of (1) between about 30 and 55 weight percent of polyvinyl chloride, (2) complementarily, between about 70 and 45 weight percent of the hereinbefore defined interpolymers of acrylonitrile or methacrylonitrile and at least one alkenyl aromatic hydrocarbon, and, as a third ingredient, between about 2 and 20 weight percent, based on the sum of the weights of the polymeric ingredients (1) and (2), of a mutualizing agent comprising an adduct of hexachloropentadiene and a vinyl aromatic compound selected from the group consisting of divinyl benzene, monovinyl aromatic hydrocarbons of the benzene series and nuclear chlorinated monovinyl aromatic hydrocarbons of the benzene series.

The vinyl chloride polymers to be employed in the composition are those materials containing at least about 80 weight percent of vinyl halide in the polymer molecule with any remainder being one or more monoethylenically unsaturated comonomers. Thus, there may be utilized the homopolymer of vinyl chloride, vinyl fluoride and the like as well as copolymers and interpolymers containing the required amounts of vinyl halide together with the lesser amounts of monoethylenically unsaturated comonomers. As purely exemplary of such monoethylenically unsaturated comonomers are: vinylidene halides such as vinylidene chloride; vinyl esters such as vinyl acetate, vinyl propionate; acrylic and alpha-alkyl acrylic acids, their alkyl esters, their amides and their nitriles such as acrylic acid, methacrylic acid, methyl acrylate, butyl acrylate, methyl methacrylate and acrylonitrile, among many others known to those in the art.

The polyvinyl chloride to be employed in the compositions can be any of the usual commercial grades of polyvinyl chloride having a molecular weight corresponding to a viscosity characteristic of from about 1.1 to 2.5 centipoises as determined for a 2 weight percent solution of the polyvinyl chloride in ortho-dichlorobenzene at 120° C.

The resinous copolymer of acrylonitrile or methacrylonitrile and the tertiary alkyl alkenyl aromatic hydrocarbon can be a copolymer of from 15 to 35 weight percent of acrylonitrile or methacrylonitrile and correspondingly from 85 to 65 weight percent of one or more alkenyl aromatic hydrocarbons having the general formula

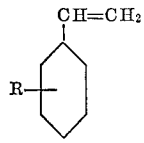

wherein R is a tertiary alkyl radical having from 4 to 8 carbon atoms, or a copolymer of from 15 to 35 weight percent of acrylonitrile or methacrylonitrile and from 85 to 65 weight percent of a mixture of monomers that is at least 15 weight percent of at least one tertiary alkyl alkenyl aromatic hydrocarbon as defined above and up to 85 weight percent of at least one alkenyl aromatic hydrocarbon having the formula

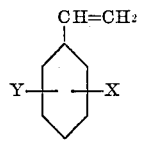

wherein X and Y are independently selected from the group consisting of hydrogen, halogen and alkyl having from 1 to 3 carbon atoms. As exemplary of such alkenyl aromatic hydrocarbons are: styrene, vinyl toluene, vinyl xylene, ar - ethylvinylbenzene, isopropylstyrene, ortho-chlorostyrene, 2,4-dichlorostyrene, tertiary-butyl styrene, tertiary amyl styrene, tertiary hexylstyrene, and tertiary octylstyrene.

Mutualizing agents can be employed for enhancing the fusion blending of the compositions but are not required. Among suitable mutualizing agents are the addition reaction products or adducts of hexachlorocyclopentadiene and a vinyl aromatic compound of the benzene series such as styrene, vinyl toluene, vinyl xylene, ar-ethylvinylbenzene, isopropylstyrene, 2,4-dichlorostyrene, 2,5-dichlorostyrene, ar-chlorostyrene or divinyl benzene. These adducts, as further described in the forementioned U.S. Patent 3,043,795, issued July 10, 1962, can be prepared by reacting hexachlorocyclopentadiene with the vinyl aromatic compounds by procedures similar to that described in the U.S. Patent No. 2,952,711, issued Sept. 13, 1960.

The compositions are prepared by heat plastifying and mechanically working the polymeric ingredients in admixture with one another in usual ways such as by blending of the polymeric materials on heated rolls, in a Banbury mixer, or in a plastics extruder, at temperatures between about 140° C. and 240° C. until a homogeneous and uniform composition is obtained. In general, compounding the heat plastified ingredients with one another at the above-mentioned temperatures for periods of from 1 to 20 minutes is satisfactory. The ingredients should not be compounded at the elevated temperature for prolonged periods of time such as to result in deterioration or breakdown of the polymeric ingredients. It may be mentioned that when compounding the polymeric ingredients with one another and a mutualizing agent, best results are usually obtained by first compounding or milling the acrylonitrile-alkenyl aromatic hydrocarbon copolymer with the mutualizing agent to obtain a uniform composition, and in the case of a crystalline mutualizing agent, at temperatures near or about the melt point of such agent, and thereafter adding the vinyl chloride polymer, e.g., polyvinyl chloride suitably as powder, or in molten form, to the heat plastified mass, and thereafter milling or compounding the resultant mixture at heat plastifying temperatures to intimately blend the polymeric ingredients and the mutualizing agent into a uniform composition. The compostion is then cooled and ground to a granular form suitable for molding.

The compositions of the present invention consist essentially of the vinyl halide and the alkenyl aromatic hydrocarbon-acrylonitrile copolymer, in the proportions hereinbefore stated, but as is usual with compositions containing significant amounts of vinyl halide polymers, the compositions additionally preferably contain a small amount, suitably from about 1 to 5 weight percent based on the weight of the composition, of a stabilizing agent intimately incorporated therewith. Exemplary of suitable stabilizing agents are: basic lead carbonate, lead orthosilicate, cadmium stearate, cadmium laurate, cadmium octoate, cadmium ricinoleate, barium cadmium laurate, dibutyl tin mercaptide, cadmium 2-ethyl hexoate, sodium ricinoleate and sulfur containing organotin compounds such as dibutyl tin S,S'-bis(3,5,5-trimethylhexylmercaptoacetate) among others.

Other additives such as plasticizers, flow agents, mold release agents, dyes, pigments, or lubricants can be incorporated with the composition but are not required in the invention. Such additives, when used, are usually employed in amounts from 0.5 to 20 percent by weight of the composition.

The new compositions are easily processable, rigid, flame-resistant thermoplastic compositions possessing excellent heat distortion properties. They can be molded by conventional means to form transparent plastic articles such as sheet, film, rods, tapes, strips, boxes, or cups which are useful for a variety of purposes.

The following examples illustrate ways in which the principle of the invention has been applied, but are not to be construed as limiting its scope.

Example 1

In each of a series of experiments varying amounts of a copolymer of about 75 weight percent of tertiary-butyl styrene and 25 weight percent of acrylonitrile was heat plasticized with polyvinyl chloride containing 3 weight percent of a commercially available sulfur containing organotin compound as stabilizer, by milling the materials on a pair of laboratory rolls at a temperature of about 180° C. for a period of about 20 minutes to form a homogeneous composition. The mixture was then removed from the rolls, was allowed to cool to room temperature and was crushed to a granular form. Portions of the compositions were injection molded to form test pieces of ⅛ x ½ inch cross section. The test pieces were used to determine the tensile strength and elongation for the product employing procedures similar to that described in ASTM D638–49T. Impact strength was determined using procedures similar to that described in ASTM D256–47T. Other molded test pieces were used to determine a heat distortion temperature for the composition employing a procedure similar to that of Vicat (see German Industrial Standard Din-Blatt 57302, Beuth Vertrieb—G.m.b.H., Berlin W. 15).

Table I identifies the composition by giving the proportions of the ingredients present in the blended mixture, and the physical properties determined for the compositions.

Example 2

In each of a series of experiments, a resinous copolymer of 15 weight percent tertiary-butyl styrene, 60 weight percent styrene and 30 weight percent acrylonitrile was blended with polyvinyl chloride to form a homogeneous composition employing procedure similar to that employed in Example 1. Table II identifies the compositions and gives the properties of the product.

TABLE I

| Run No. | Starting materials | | Properties of product | | | | |
|---|---|---|---|---|---|---|---|
| | Tert-butyl styrene-VCN copolymers, percent | Polyvinyl chloride, percent | Tensile strength, lbs./sq. in. | Elongation, percent | Impact strength | | Color |
| | | | | | Notched, ft.-lbs. | Unnotched, ft.-lbs. | |
| 1 | 30 | 70 | 8,558 | 2.7 | 0.235 | 5.81 | Transparent. |
| 2 | 50 | 50 | 7,638 | 2.5 | 0.174 | 7.28 | Do. |
| 3 | 55 | 45 | 9,291 | 3.9 | 0.096 | 8.35 | Do. |

TABLE II

| Run No. | Starting material | | Product | | | | |
|---|---|---|---|---|---|---|---|
| | Copolymer, percent | Polyvinyl chloride, percent | Tensile strength, lbs./sq. in. | Elongation, percent | Impact strength | | Color |
| | | | | | Notched, ft.-lbs. | Unnotched, ft.-lbs. | |
| 1 | 30 | 70 | 10,669 | 5.0 | 0.031 | 9.56 | Transparent. |
| 2 | 50 | 50 | 10,530 | 5.1 | 0.238 | 6.78 | Do. |
| 3 | 45 | 55 | 9,429 | 7.5 | 0.349 | 14.5+ | Do. |

Example 3

A composition of 45 weight percent of a resinous copolymer of 37.5% tert.-butyl styrene, 37.5% styrene and 25% acrylonitrile, and 55 weight percent polyvinyl chloride was prepared employing procedure similar to that employed in Example 1. The composition had the properties:

Tensile strength _____ 9542 lbs./sq. in.
Elongation _____ 9 percent.
Notched impact strength _____ 0.379 ft.-lbs.
Unnotched impact strength _____ 13.7 ft.-lbs.
Color _____ Transparent.

Employing procedure similar to that employed in Example 1, compositions of polyvinyl chloride and a resinous copolymer of a tertiary alkyl styrene and acrylonitrile or methacrylonitrile were prepared as follows:

(a) 50 weight percent polyvinyl chloride and 50 weight percent of a copolymer of 75 weight percent tert.-octylstyrene and 25 percent acrylonitrile, (b) 50 weight percent polyvinyl chloride and 50 weight percent of a copolymer of 75 weight percent tert.-butyl styrene and 25 percent methacrylonitrile, (c) 50 weight percent polyvinyl chloride and 50 weight percent of a copolymer of 75 weight percent tert.-amyl styrene and 25 percent acrylonitrile.

Each of the compositions (a), (b) and (c) were tough, rigid, transparent products when molded by compression or injection molding procedure.

What is claimed is:
1. A rigid, thermoplastic composition comprising an intimate mixture of:
(1) between about 30 and 55 weight percent of a vinyl chloride polymer containing at least about 80 weight percent of polymerized vinyl chloride in the polymer molecule with any remainder being at least one monoethylenically unsaturated comonomer, and
(2) complementarily, between about 70 and 45 weight percent of a copolymer of from:
(a) 15 to 35 weight percent of acrylonitrile or methacrylonitrile, and
(b) 85 to 65 weight percent of at least one alkenyl aromatic hydrocarbon having the formula

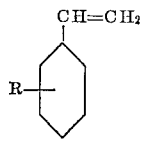

wherein R is a tertiary alkyl radical having from 4 to 8 carbon atoms or a mixture of at least 15 weight percent of at least one such tertiary alkyl alkenyl aromatic compound and up to 85 weight percent of an alkenyl aromatic hydrocarbon having the formula

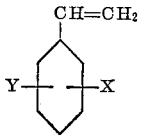

wherein X and Y are independently selected from the group consisting of hydrogen, halogen and alkyl radicals having from 1 to about 3 carbon atoms.

2. A composition as claimed in claim 1, wherein the vinyl chloride polymer is polyvinyl chloride.

3. A composition as claimed in claim 1, wherein the copolymer is a copolymer of acrylonitrile and tert. butyl styrene.

4. A composition as claimed in claim 3 wherein the vinyl chloride polymer is polyvinyl chloride.

References Cited

UNITED STATES PATENTS 2,646,417  7/1953  Jennings.
2,988,530  6/1961  Slocombe et al.

SAMUEL H. BLECH, *Primary Examiner.*

J. W. SNOW, *Assistant Examiner.*

U.S. Cl. X.R.
260—80.78, 23